United States Patent Office 3,061,011
Patented Oct. 30, 1962

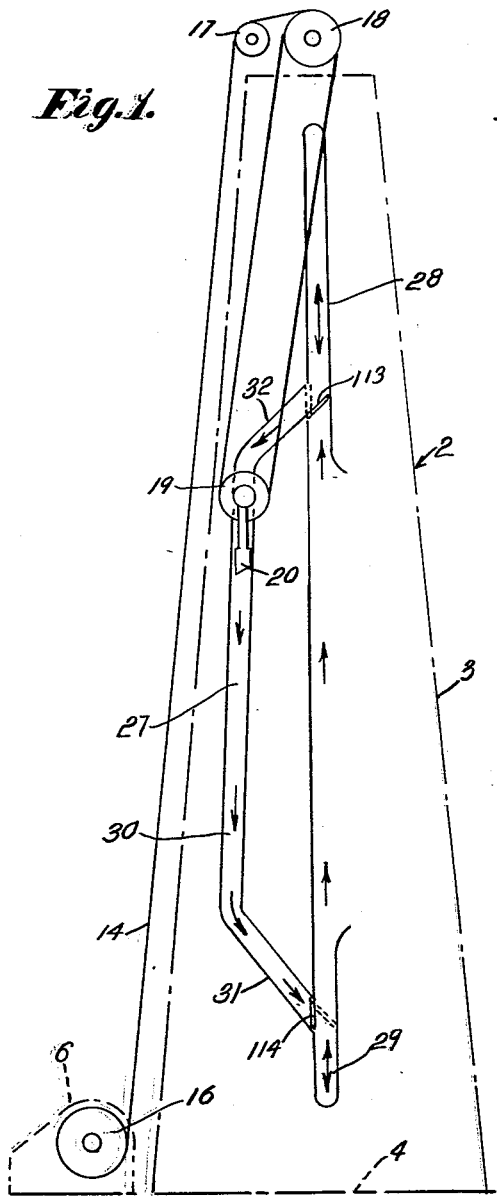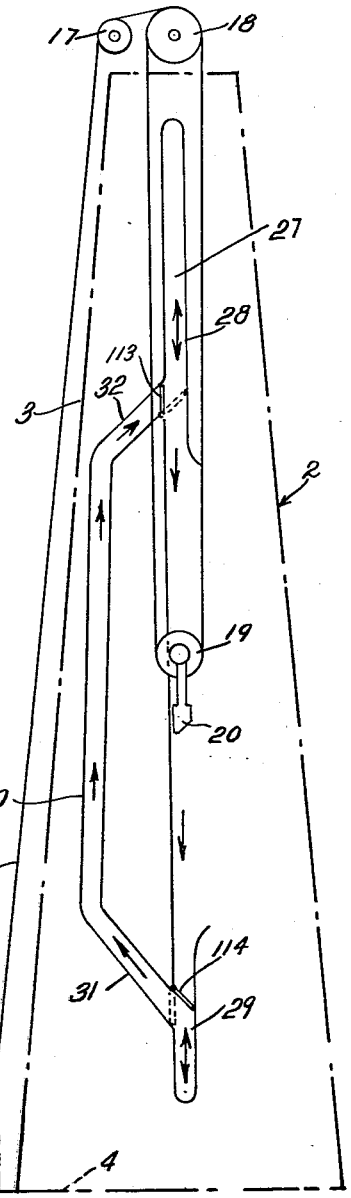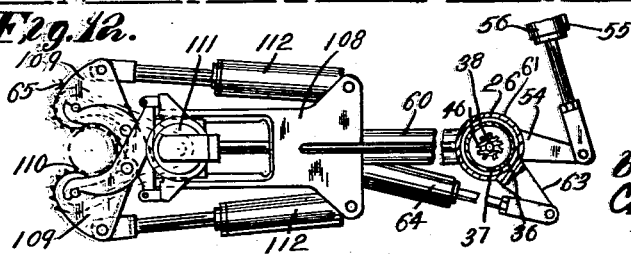

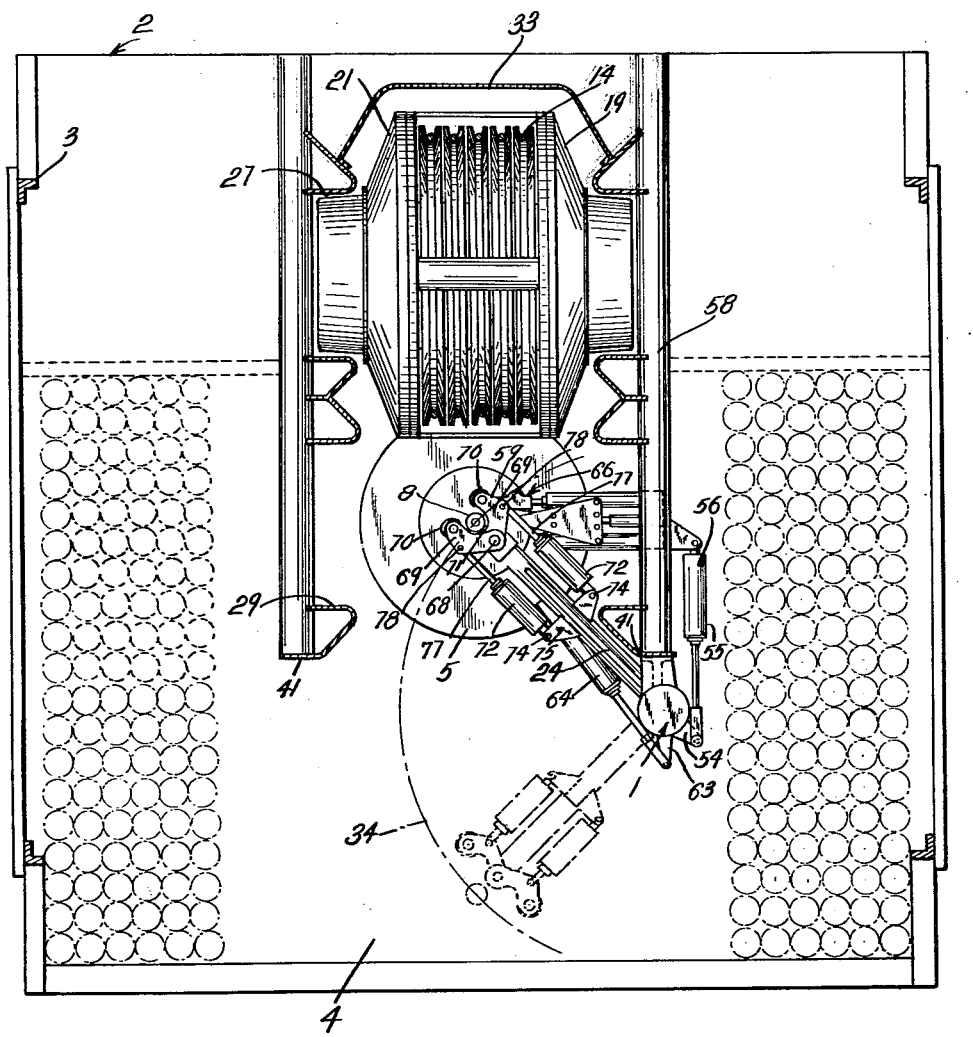

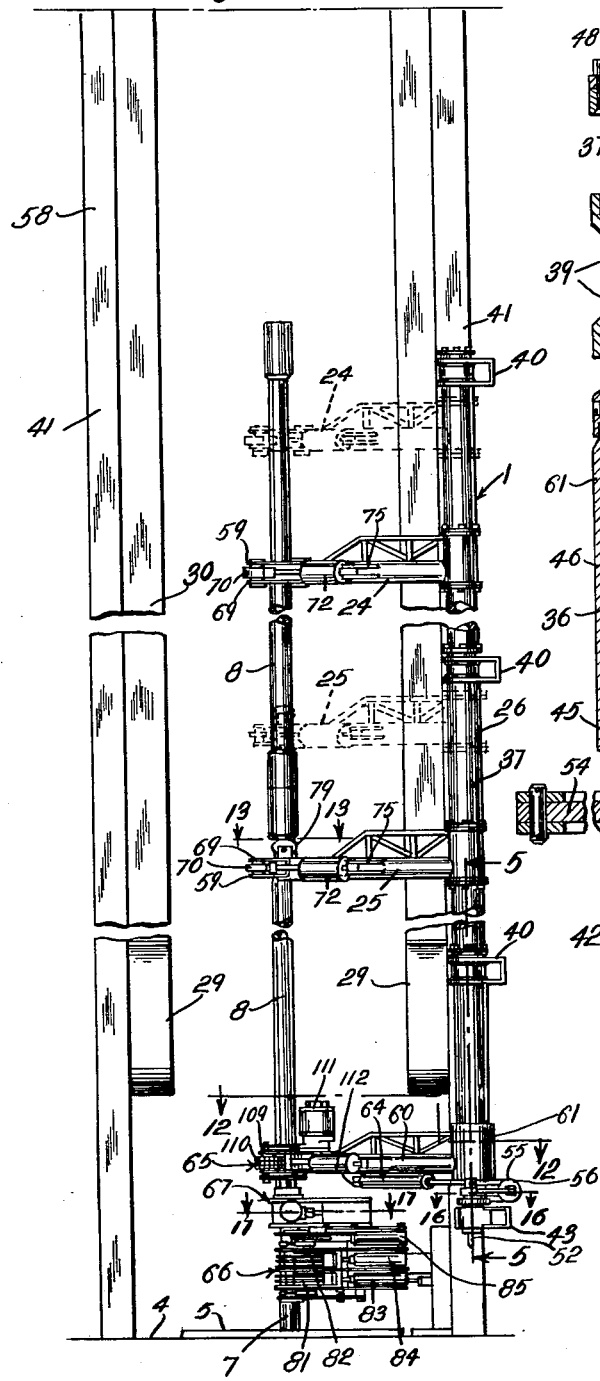

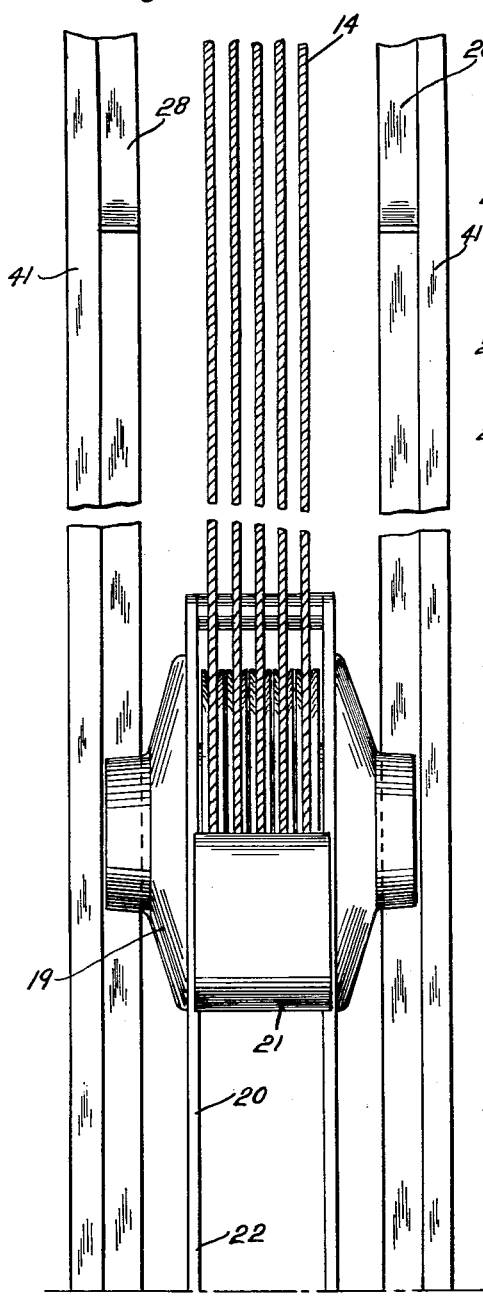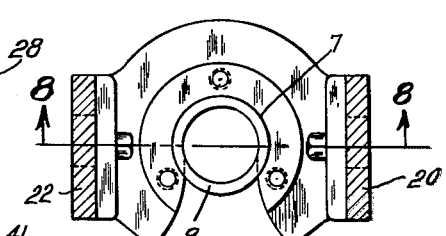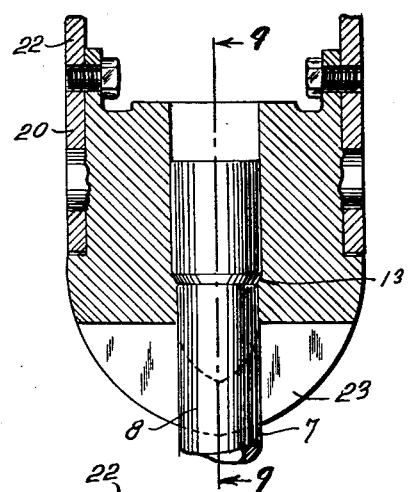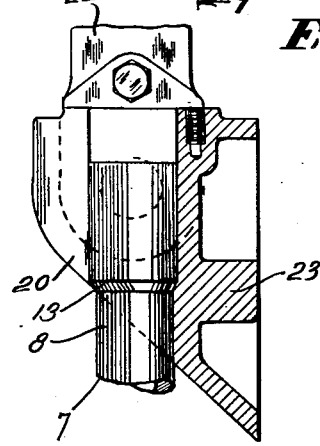

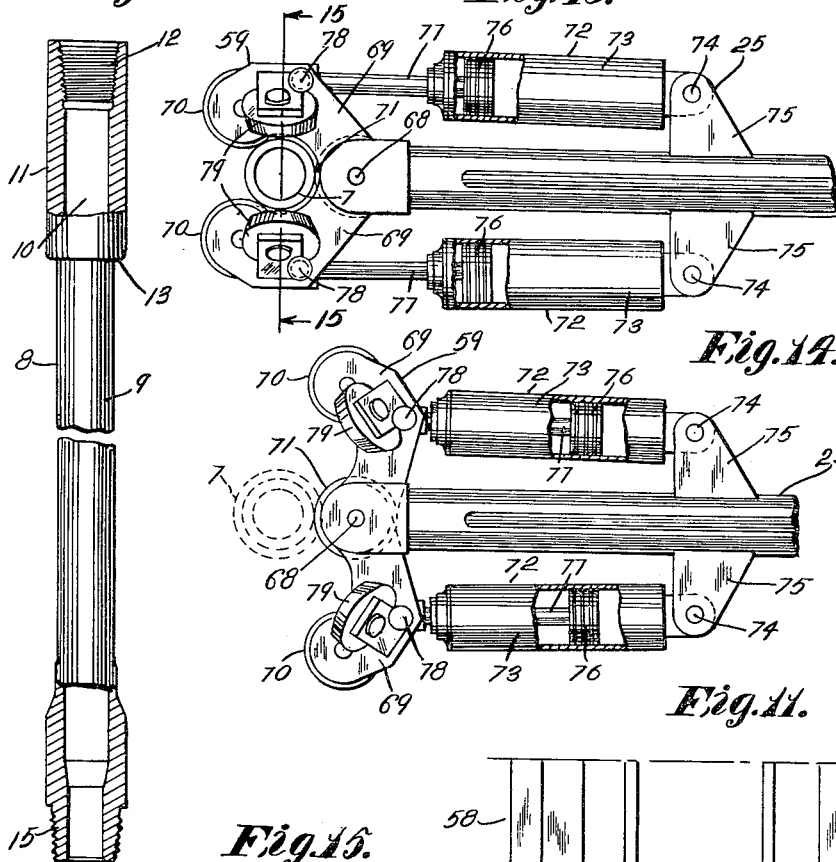

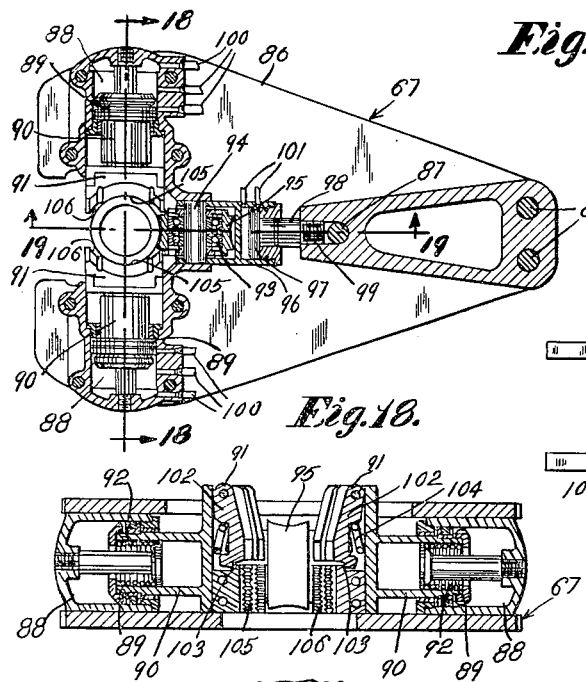
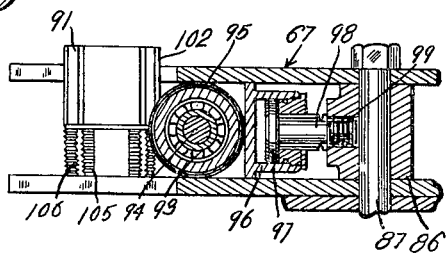
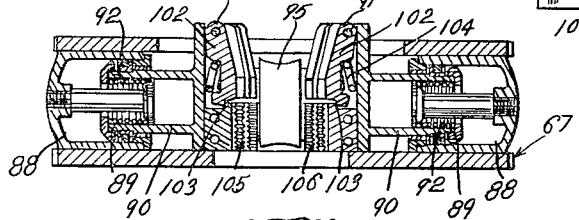
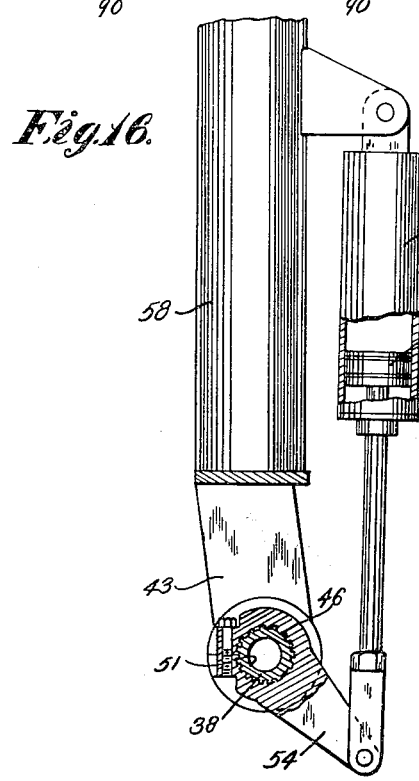
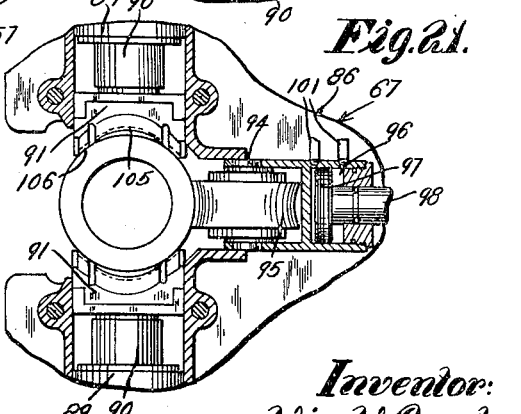

3,061,011
TRANSFER MECHANISM FOR THE DRILL PIPE
OF AN OIL FIELD DRILL RIG
Win W. Paget, Mountain Brook, Ala., assignor to Joy
Manufacturing Company, Pittsburgh, Pa., a corporation of Pennsylvania
Original application May 5, 1955, Ser. No. 506,131.
Divided and this application Feb. 24, 1958, Ser. No. 716,923
16 Claims. (Cl. 166—77.5)

This invention relates to a transfer mechanism and more particularly to a transfer mechanism for the drill pipe of the drill string of an oil field drill rig.

In a conventional oil field drill rig, the rotary table of the drill and the draw works are mounted on the floor of a derrick and the drill pipe sections or stands of the drill string are stacked within the derrick. Usually, the drill pipe sections or stands are handled by the hoisting line of the draw works, and a sheave hook carried by the drop line of the hoisting cable is usually connected to the drill pipe for raising, lowering, transferring and stacking or storing the same, all in a conventional manner. The present invention contemplates improvements over the usual pipe-handling mechanism of a drill rig in that an improved transfer mechanism is provided for mechanically coupling and uncoupling the joints of the pipe stands, for elevating the pipe stands and for transferring the same between drilling and stacked position, with a minimum of manual intervention.

An object of the present invention is to provide an improved transfer mechanism for the drill pipe of an oil field drill rig for facilitating the handling of the pipe sections or stands. Another object is to provide an improved transfer or handling mechanism for coupling, uncoupling and handling the pipe stands of a drill string and for transferring the pipe stands toward stacked position whereby handling of the drill pipe during running of the drill string into, and the coming out of the string from, the hole is facilitated and expedited. A still further object is to provide an improved transfer shaft, column or post having elevating means associated therewith whereby the pipe sections or stands may be raised or lowered in an improved manner. Another object is to provide an improved transfer shaft, column or post with which a pipe-coupling or uncoupling device, a transfer device, and elevator are associated whereby the drill pipe sections may be quickly uncoupled and transferred toward stacked or stored-away positions within the derrick. Still another object is to provide an improved transfer mechanism adapted for association with a conventional oil field drill rig for the mechanization of certain operations of the drill rig. These and other objects and advantages of the invention will, however, hereinafter more fully appear as the description proceeds.

This application is a division of my copending application Serial No. 506,131, filed May 5, 1955, now abandoned, of which copending application Serial No. 716,934 is also a division.

In the accompanying drawings there is shown for purposes of illustration one form which the invention may assume in practice.

In these drawings:

FIGS. 1 and 2 are somewhat diagrammatic views of the derrick of an oil field drill rig, showing the improved guiding trackway for the traveling block and elevator.

FIG. 3 is an enlarged horizontal section through the derrick, looking toward the derrick floor and showing details of the improved transfer mechanism.

FIG. 4 is a fragmentary side elevational view of a portion of the drill rig, showing the improved transfer mechanism associated therewith.

FIG. 5 is an enlarged vertical section taken on line 5—5 of FIG. 4.

FIG. 6 is a fragmentary side elevational view, showing the traveling block and a portion of its guiding track shown in FIG. 3.

FIG. 7 is a horizontal section, taken on line 7—7 of FIG. 11, showing details of the elevator associated with the traveling block.

FIG. 8 is a detail vertical section taken on line 8—8 of FIG. 7.

FIG. 9 is a detail vertical section taken on line 9—9 of FIG. 8.

FIG. 10 is a detail side view, with parts in section, of a special drill pipe section.

FIG. 11 is a side view of the lower portion of the elevator shown in FIG. 6.

FIG. 12 is an enlarged horizontal section, taken on line 12—12 of FIG. 4, showing the lower supporting arm which carries the pipe spinning device.

FIG. 13 is an enlarged horizontal section, taken on line 13—13 of FIG. 4, showing the intermediate supporting head or arm of the transfer shaft.

FIG. 14 is a view similar to FIG. 13, showing the pipe-gripping levers in wide apart released position.

FIG. 15 is an enlarged cross section, taken on line 15—15 of FIG. 13, showing the angle-set rollers for engaging the drill pipe shoulder.

FIG. 16 is an enlarged detail horizontal section, taken on line 16—16 of FIG. 4.

FIG. 17 is an enlarged horizontal section taken through the transfer clamp on line 17—17 of FIG. 4.

FIG. 18 is an enlarged cross section taken on line 18—18 of FIG. 17.

FIG. 19 is a longitudinal vertical section taken on line 19—19 of FIG. 17.

FIGS. 20 and 21 are enlarged detail views, respectively showing the gripping jaws of the transfer clamp in gripping contact with drill pipe and casing of different diameters.

The improved pipe-handling or transfer mechanism, generally designated 1, is shown associated with a conventional oil field drill rig, generally designated 2.

The drill rig includes the usual derrick 3, a derrick floor 4, a rotary table 5 and a draw works or hoisting mechanism 6. The rotary table is adapted to engage the usual kelly for rotating a drill string 7 made up of a series of drill pipe sections 8 coupled together by tool joints of the threaded pin and box type.

In FIG. 10, one of the special drill pipe sections is shown comprising a tubular body 9 having an axial fluid passage 10 extending centrally therethrough and the pipe body has a drill collar 11 at the box end 12 of the pipe section with the drill collar providing a downwardly facing shoulder 13 for engagement by the pipe elevator during hoisting and lowering of the drill pipe by the cable 14 of the draw works. The pin end 15 has a threaded pin receivable in the threaded socket of the box end of the adjacent pipe section. The draw works or hoisting mechanism has a hoisting drum 16 on which the hoisting cable is wound and the cable 14 extends upwardly from this drum around a guide sheave 17 at the top of the derrick and from this guide sheave around multiple top sheaves 18. The multiple strands or reeves of the hoisting cable extending from the top sheave 18 pass around the sheave of a traveling block or sheave 19 by which an automatic elevator 20 is carried. This elevator is suspended from the casing 21 of the traveling block (FIGS. 6 and 11) and comprises a bail 22 carrying a bottom yoke 23 (FIGS. 7, 8 and 9) which may be laterally attached to the drill pipe below the shoulder of the upper tongs thereby to suspend the drill pipe from the elevator and when the cable is wound in or payed out, the drill pipe may be raised or lowered as desired. Suitable adaptors may be attached to the elevator yoke to provide different size sockets for the reception of drill pipe sections of different diameters.

It will be noted that the elevator 20 is of the type which does not swivel so that make and break tongs and a spinning device cannot safely be used while the drill pipe is supported in the elevator. Normally, as later described, the drill pipe may be supported in the roller heads of lateral, vertically spaced, upper and intermediate arms 24 and 25 of a vertical transfer shaft 26 of the transfer or handling mechanism, and the roller heads on the outer portions of the arms 24 and 25 do permit rotation of the pipe and can impart the desired "spring effect" for "jumping" the pin out of the box at the moment of a disengagement by the tongs. The conventional kelly which cooperates with the rotary table in the rotation of the drill string is usually attached to the upper end of the drill string and passes through the rotary table in such a manner that it may be rotated by the table as it moves axially therethrough. This kelly may have a conventional swivel at its upper end and when the drill pipe is supported from this swivel it can be rotated at any time, but in handling drill collars either a conventional elevator should be coupled on below the automatic elevator, or swivels should be provided in the elevator subs for the drill collars.

The derrick mast, in this improved construction, carries guide tracks 27 for the traveling block 19, as shown in FIGS. 1 and 2, for confining movement of the block in a definite path, and these tracks include aligned vertical front rail portions 28 and 29 having a front opening therebetween. A rear vertical return track portion 30 has an inclined bottom track portion 31 and an upper inclined track portion 32. The track is shown in cross section in FIG. 3 on an enlarged scale, and a continuous slick sheet 33 is located at the back of the return track to prevent the elevator from fouling the derrick girts. FIG. 3 also shows the fourble board in horizontal section with pipe sections or stands stacked within the derrick, as indicated in dotted lines, and the arcuate path of swing of the transfer arms is indicated in broken lines at 34.

Now referring to the transfer shaft or vertical column or post 26, it will be noted that extending vertically within the derrick is a tubular extendable shaft member 36 having an outer extendable tubular shaft portion or section 37 and an inner tubular shaft portion or section 38 telescopically arranged within the outer portion, as shown in FIG. 5. The outer shaft portion 37 is rotatably and slidably mounted in bearings 39 supported by bearing supports or brackets 40 secured to a vertical plate 41 of the derrick mast. The inner telescopic shaft portion 38 is rotatably mounted in bearings 42 supported within a bearing support or bracket 43 secured to the lower portion of the vertical plate 41. The lower head 44 of the outer shaft portion 37 has splines 45 engaging splineways 46 on the exterior periphery of the inner shaft portion 38 so that the shaft portions of the extendable shaft 36 rotate together. Secured to an intermediate head plate 48 of the outer shaft element is a piston rod 49 to the lower end of which a piston 50 is secured, and this piston is reciprocable within a cylinder bore 51 provided by the inner shaft element 38. A liquid conduit 52 is attached to a bottom cap 53 threaded on the lower portion of the shaft portion 38 and when liquid under pressure or other pressure fluid is supplied from a suitable source to the cylinder bore beneath the piston, the latter moves upwardly extending the outer shaft portion 37 upwardly along a vertical path within the derrick. A horizontal lever 54 is keyed to the inner shaft portion 38 and an extensible fluid jack 55 having a cylinder 56 containing a reciprocable piston 57 (FIG. 16) is pivotally connected to the lever 54 and the frame 58 (FIG. 3) of the derrick mast. Thus, by properly supplying fluid under pressure to the fluid jack 55 the extendable telescopic shaft 36 may be rotated about its vertical axis and by trapping fluid within the jack cylinder the shaft may be locked in adjusted position.

Secured to the extendable upper shaft portion or section 37 are the spaced apart upper and intermediate arms 24 and 25 which carry the roller supporting heads 59 for the drill pipe. A horizontal bottom arm 60 is secured to a sleeve 61 surrounding the vertical shaft and rotatably mounted on bearings 62 supported by the outer shaft portion 37 (FIG. 5). Projecting from the bottom bearing bracket 43 for the vertical transfer shaft is a rigid lever arm 63 (see FIGS. 3 and 12) and connected between this lever arm and the lower arm 60 is an extensible fluid jack 64 for swinging the lower arm horizontally on its pivotal mounting on the vertical transfer shaft and fluid may be trapped in the jack cylinder to lock the lower arm in adjusted position. Carried by the bottom arm 60 is a spinning device or spinning head, generally designated 65, for the drill pipe sections of the type disclosed in my application Serial No. 506,148, filed May 5, 1955, and now matured into Patent No. 2,784,626, dated March 12, 1957. This spinning device also may be similar to that disclosed in my application Serial No. 335,477, filed February 6, 1953, and now matured into Patent No. 2,746,329, dated May 22, 1956.

Mounted on the derrick floor beneath the lower arm 60 of the spinning device is a make and break tong, generally designated 66, which may be similar to that disclosed in my application Serial No. 428,979, filed May 11, 1954, and now matured into Patent No. 2,760,392, dated August 28, 1956. Mounted at the top of the tong 66 beneath the spinning device is a transfer clamp, generally designated 67.

The upper and intermediate arms 24 and 25 of the transfer shaft carry the roller supporting heads 59 for engaging the upper pipe sections for supporting the latter during the uncoupling of the lower tool joint by the make and break tong 66 and the spinning device 65, and these roller heads permit the upper pipe sections or pipe stand to revolve during the spinning operation. These roller heads are similar in design, and therefore a description of the intermediate head shown in FIGS. 13 and 14 will suffice for both. Pivotally mounted on a vertical pivot pin 68 are lever arms 69 which carry rollers 70 and an intermediate roller 71 is journaled on the arm in coaxial relation with the pivot pin 68. Extensible fluid jacks 72 comprise cylinders 73 pivotally mounted at 74 on lateral brackets 75 integral with the arms. Reciprocable in these cylinders are pistons 76 having piston rods 77 pivotally connected at 78 to the lever arms. Thus, when fluid under pressure is properly supplied to the cylinders of the fluid jacks the pistons are moved outwardly to swing the lever arms about their pivots to bring the rollers 70 and 71 into guiding contact with the cylindrical periphery of the drill pipe. The roller head of the intermediate arm has relatively inclined angle-set rollers 79 respectively mounted on the lever arms 69, as shown in FIG. 15, and these rollers ride against the shoulder 13 of the drill collar in the manner shown.

The make and break tonging unit 66, as disclosed in application Serial No. 428,979, has lower gripping jaw means 81 for engaging the box end of the underlying pipe section of the drill string for holding this pipe section against rotation, and also has an upper gripping jaw means 82 for gripping the pin end of the adjacent upper drill pipe. These upper and lower jaw means have extensible fluid jacks 83 and 84 for operating the same. Extensible fluid jacks 85 are also provided for positioning the upper gripping means. Upon rocking movement of the upper jaw means 82, the upper drill pipe section may be turned in the desired direction either to make or break the joint.

Now referring to the transfer clamp 67 mounted at the top of the make and break tonging unit 66, it will be noted that this clamp is necessitated by the fact that the make and break tonging unit, or make-up and break-out mechanism, is released before the spinning device goes into operation and the upper pipe section of the stand must be supported prior to the time when the spinning device goes into action. This transfer clamp, as shown in FIGS. 17, 18 and 19, comprises a horizontal frame 86 desirably secured, as by bolts 87, to the top of the frame of the make and break tonging unit 66. Extending transversely of the clamp-frame are aligned fluid cylinders 88 containing reciprocable pistons 89, the latter having their piston rods 90 secured to clamping jaws 91 for gripping the exterior periphery of the drill pipe. Coil springs 92, arranged between the pistons and a flange secured to central guide members fixed to the cylinder heads, constantly urge the gripping jaws toward their released positions. Journaled on bearings 93 supported by a transverse shaft 94 is an accelerating roller 95 engaging the lower portion of the stand of drill pipe intermediate the gripping jaws 91 (see FIG. 17). This shaft 94 is mounted on a reciprocable fluid cylinder 96 containing a stationary piston 97, the latter having its piston rod 98 secured, at 99, to the clamp-frame 86. The cylinders 88 have suitable fluid conduits 100 connected thereto while the reciprocable cylinder 96 has flexible fluid conduits 101. Thus, when fluid under pressure is properly supplied to these cylinders, the roller 95 may be brought up against the side of the drill pipe while the gripping jaws 91 are moved inwardly into gripping engagement with the drill pipe. When the jaws 91 are released, the roller 95 may guide the drill pipe during its axial motion. The gripping jaws 91 must engage tool joints of different diameters and the jaws have gripping teeth so designed to grip either diameter of joint. Mounted within the clamp-frame above the gripping jaws are tapered guide blocks 102, desirably of reinforced plastic so as not to damage the tool joint shoulder, and these blocks are yieldably held out against stops 103 on the jaws by springs 104. Thus, by the provision of these tapered guide blocks the pin tool joint will be guided into the gripping jaws. The guide blocks 102, the jaws 91 and the rim of the roller 95 are finished to two radii, and the different radii on the gripping jaws are respectively designated 105 and 106. These two radii are formed with gripping teeth or serrations with the serrations on radius 105 made to fit the smaller diameter joint, while those on radius 106 are made to fit the larger diameter joint (FIG. 20 and 21).

The spinning device 65, as disclosed in application Serial No. 506,148, comprises a frame 108 (FIG. 12) on which lever arms 109 are pivotally mounted and an endless drive chain 110 is guided for circulation along guides carried by the lever arms and a motor-driven drive member 111. Extensible fluid jacks 112 serve to swing the lever arms about their pivots to bring the endless drive chain into gripping engagement with the drill pipe and when the pipe is firmly embraced by the drive chain, the latter may be driven by its motor rapidly to rotate the drill pipe, completely to disconnect the tool joint. The extensible fluid jack 64 may be operated to swing the spinning device horizontally about the axis of the upright transfer shaft or post between the positions shown in full and dotted lines in FIG. 3.

The lever arms 109 of the spinning device for adjusting the spinning chain are held wide apart, as shown in dotted lines in FIG. 3, prior to engagement with the drill pipe to prevent the chain from fouling the end of the pin tool joint during engagement, and since a substantial movement of these arms is necessary before the spinning chain is in full engagement with the drill pipe the latter must at that time be supported by the jaws of the transfer clamp. In other words, after the tool joint is broken by the make and break tonging unit 66 and prior to the operation of the spinning device 65, the upper stand of drill pipe is supported by the transfer clamp 67 and as the spinning chain engages the drill pipe, fluid flow with respect to the cylinders 88 may be controlled to move the pistons outwardly to release the gripping jaws 91 from the pipe and as the spinning device goes into effect, the rollers of the supporting heads carried by the upper and intermediate arms 24 and 25 are brought into operation and during spinning of the upper pipe stand, fluid under pressure may be supplied to the cylinder 39 of the extendable transfer shaft or post to move the piston 50 upwardly so that the spinning device, as it effects rapid rotation or spinning of the pipe, moves upwardly with the pipe in unison therewith. When the spinning device has completed its spinning function, the lever arms thereof may be swung outwardly by the fluid jacks 112 to release the spinning chain from the drill pipe and at that time the upper pipe stand is rotatably supported by the roller supporting heads on the upper and intermediate transfer arms 24 and 25 and as fluid supply to the elevating cylinder 38 is continued, the transfer shaft is extended axially upwardly to elevate the disconnected stand of drill pipe. When the pipe stand is in elevated position, as shown in dotted lines in FIG. 4, fluid under pressure may be supplied to the swing cylinder 56 of the fluid jack 55 to rotate the transfer shaft to swing the transfer arms 24 and 25 laterally from the full line position shown in FIG. 3 to the dotted line position, thereby to move the disconnected stand of pipe along its arcuate path 34 toward its stacked position within the derrick. When the transfer arms assume the dotted line position shown in FIG. 3, the levers of the roller supporting heads 59 may be swung apart to release the drill pipe. Any suitable pipe-handling mechanism may be associated with the transfer shaft to receive the pipe stands upon release of the roller supporting heads and to move them into stacked position, and since this particular handling mechanism does not per se enter into the present invention, illustration and description thereof are herein unnecessary. Conversely, the pipe-handling mechanism and the transfer mechanism together with the roller heads, the spinning device, the transfer clamp and the make and break tonging unit may be operated to move the pipe sections from their stacked positions within the derrick into positions for connection to the upper end of the drill string.

The automatic racking boards are shown diagrammatically in FIG. 3 but are not described in detail, since they may assume various forms because a great deal of diversity is possible in the design of such an item. Also, it is quite possible to pick up the stand of drill pipe from the "drain" position with a cat line or small hoist, and rack in conventional fashion.

The upper vertical track portion 27 of the guide track for the traveling block 19, by its guiding engagement with the block casing, holds the block against undesired turning motion during running of the drill pipe into and out of the hole as the pipe stands are coupled and uncoupled by the tongs, transfer clamp and spinning device. The automatic elevator suspended from the traveling block is automatically disconnected from, and connected to, the drill pipe collars as the block travels in its fixed orbital path. When the traveling block and elevator are in lowered position within the lower track portion 29 their direction of travel may be reversed and, as they travel upwardly, they move along the inclined track portion 31 to release the elevator yoke from the drill pipe, then move upwardly along the vertical track 30 and finally along the inclined upper track portion 32. As the traveling block again enters the upper vertical track portion 27, the elevator yoke 23 is automatically brought into engagement with the upper pipe section beneath the shoulder 13 of the upper tool box 11. Suitable gates or track "switches" 113 and 114 (FIGS. 1 and 2) are provided for directing the traveling block along the proper trackway as the block is raised and lowered. From the foregoing, it will be evident that the elevator 20 automatically engages the drill pipe and is automatically released from the pipe at the proper points in the travel of the block 19 along its guiding track. Also, the reverse track 30, 31, 32 serves to hold the traveling block in an out-of-the-way position as the block moves upwardly. For special operations such as handling the casing, or the breaking up of the drill string on the final trip out of the hole, conventional elevators may be suspended below the automatic elevator, if desired. As previously mentioned, the front rails of the guide track for the traveling block between the vertical track portions 28 and 29 are open over a considerable span and this open portion of the track is for the purpose of allowing the block to swing out when tying back the kelly, racking the drill collar, or handling the casing. The back rails of the front or working track are continuous, however, as above described, and this continuous track serves to prevent undesired rotation of the block and elevator during the drilling operation. FIG. 1 shows the drill during coming out of the hole, that is during the "out-trip," and the directions of movement of the traveling block are indicated by arrows. In FIG. 2, the drill is shown during going into the hole, that is during the "in-trip," and here, too, the directions of movement of the traveling block are indicated by arrows.

It should be noted that all of the operations of the various pieces of equipment disclosed herein may be manually controlled with conventional valves and their associated control equipment, or when automatic control is desired a high degree of interlocking, fully automatic operation may be provided. The fact that the traveling block is confined to a definite path of travel by the guide tracks, for example, lends itself readily to the use of trips or contacts associated with the guide tracks to control the operation of the draw works and its braking mechanism; and conventional hydraulic interlocks may be provided to control the operation of the tongs, spinning head, transfer shaft, etc., in the proper manner. More specifically, the fluid operated make and break tonging unit 66, the transfer clamp 67, the spinning device 65, the roller supporting heads, the elevating cylinder for the transfer post, the swing jacks 65 and 64 for adjusting the transfer post and the spinning device may be controlled to effect their various functions in the proper order by conventional manually controlled valves located at a conveniently located control station on the derrick floor. If automatic racking of the drill pipe stands is desired, various operations may be effected automatically in a definite sequence under the control of automatic valves which, under certain conditions, may be actuated by trip devices, contact switches or otherwise associated with the guide track of the traveling block in the path of travel of the latter, so that the various functions may be effected automatically at the proper times. Thus, as the traveling block is lowered along its track the pipe stands may be moved from their stacked position within the derrick into alignment with the drill string and the pipe joints may be automatically coupled by proper operation of the roller supporting heads, the spinning device, the transfer clamp, the tonging unit and the transfer shaft. Conversely, as the traveling block moves upwardly along its guide track during coming out of the hole, the various devices may be operated in reverse order automatically to uncouple, elevate, transfer and stack the pipe stands. The fluid elevating cylinder 38 for the extendable transfer shaft is, of course, operated at the proper time and at the proper speed, so that the spinning device and roller supporting heads may travel in unison with the pipe stand during their operation.

Although no particular mechanism is disclosed herein, it is proposed to blow the box threads out with properly spaced jets of air, water and air (with a suitable spray collecting system), enabling a flash inspection of the threads to be made by means of enlarging mirrors and properly located lights, and the thread lubricant may be applied to the joint threads in the small interval of time between the completion of the break-out operation and the engagement of the automatic elevator. The pin threads of each stand of pipe may be similarly cleaned and inspected at the "drain" position, more time than being both required and available because the high speed of the hoisting mechanism will make all trips very wet, as will be apparent to those skilled in the art.

The general mode of operation will be clearly apparent from the description given. When the drill pipe is to be raised for uncoupling, the traveling block and elevator are lowered into a position so that the elevator yoke 23 (FIG. 8) is brought into engagement with the upper pipe section beneath the shoulder 13 (FIGS. 8 and 9). The tonging mechanism (make and break tong) 66 is positioned to locate the lower gripping jaws below the tool joint to grip the upper end of one drill pipe and the upper jaws are positioned just above the tool joint for gripping the lower end of the adjacent drill pipe. As the respective jaws clamp the separate drill pipes, rotation of one jaw relative to the other jaw will break or loosen the joint as more fully explained in the above mentioned patent (2,760,392). As stated above, the make and break tong is then released and the transfer clamp 67 then operated to support the upper drill pipe section prior to the time when the spinning device goes into operation. The spinning device 65 mounted on sleeve 61 is swung horizontally about the pivot axis of extensible shaft 36 until the drill pipe is in a position to be grasped by the gripping head of the spinning device 65 as more fully explained in the above mentioned Patent 2,746,329. The transfer clamp 67 is released as the spinning device goes into operation. The roller supporting heads 24 and 25 also goes into operation to support the upper drill pipe when the spinning device 65 goes into operation. As the rollers of the supporting heads 24 and 25 support the upper drill pipe during the spinning operation fluid is supplied to extendable cylinder 26 to move piston 50 upwardly so that the spinning device 65 which is mounted on sleeve 61 (FIG. 5) moves upwardly with the pipe in unison. The spinning device is swung outwardly away from the drill pipe at the same time the upper drill pipe is rotatably supported by the roller supporting heads of the transfer arms 24 and 25 as the elevating cylinder 38 is continued to be moved upwardly to disconnect the upper drill pipe from the lower adjacent drill pipe. The transfer arms are then swung horizontally on transfer shaft 26 by fluid jack 55 (FIG. 16) which is connected to lever 54 which is keyed to inner shaft portion 38 (FIGS. 16 and 5). When the transfer arms 24 and 25 assume the dotted line position shown in FIG. 3, the levers of the roller supporting heads 59 may be swung apart to release the upper drill pipe. From here any suitable pipe handling mechanism may be used to receive and store the drill pipes.

As a result of this invention, an improved transfer or handling mechanism is provided for an oil well drill rig whereby the coupling and uncoupling of the pipe stands and the transferring and handling of the pipe stands are mechanized in such manner as greatly to increase the speed with which oil wells may be drilled. The improved transfer mechanism may be associated with conventional drill rigs with a minimum of change, so that drill rigs now in the field may be readily mechanized to a large degree. By the provision of the improved extendable transfer shaft or post the drill stands may be supported, elevated and transferred in an extremely effective manner, not only increasing the degree of mechanization but also improving the control of certain operations and reducing the number of men required in the drilling crew. By extending the transfer shaft or post axially in a vertical direction as the spinning operation is effected, the joints of the pipe stands after breaking may be rapidly rotated to effect disconnection as they are elevated or may be rapidly rotated to effect connection as they are lowered, without interruptions. The improved transfer and pipe-handling mechanism and the other associated devices are relatively simple and rugged in design, well adapted for their intended purposes. These and other advantages will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a pipe-handling mechanism for drill rigs, a vertical post, supporting means on said post for freely rotatably supporting a pipe-stand in suspension therefrom, rotating means on said post for rotating the pipe-stand, and means for elevating said supporting and rotating means vertically in a direction extending lengthwise of said post to elevate the pipe stand as rotation of the latter is effected by said pipe-rotating means.

2. A pipe-handling mechanism as set forth in claim 1 wherein means is provided for swivelly mounting said supporting and rotating means on said post for turning movement horizontally about the vertical axis of said post.

3. A pipe-handling mechanism as set forth in claim 1 wherein said post comprises cooperating inner and outer tubular parts having relative telescopic axial movement and said supporting and rotating means are carried by the axially movable outer part of said post.

4. In combination, a make and break mechanism for a drill pipe line having a series of pipe sections coupled together, a spinning device for rapidly rotating a stand of drill pipe, and a transfer clamp for supporting the stand of drill pipe prior to the time said spinning device goes into operation and releasable from the pipe stand when said spinning device is operated to rotate the pipe stand.

5. A combination as set forth in claim 4 wherein a hoisting mechanism is provided for the drill pipe line and elevating means is provided for said spinning device for elevating the same in unison with the pipe stand during the spinning operation.

6. In combination, a hoisting mechanism for a drill pipe line having a series of pipe sections coupled together, a make and break tonging device for connecting or disconnecting a coupling between pipe sections, vertically spaced apart roller heads having rollers for freely rotatably supporting a stand of drill pipe, and an elevating device for moving said roller heads vertically in unison to cause elevation of the stand of drill pipe when the pipe stand is uncoupled from the pipe line, said elevating device permitting free rotation of the pipe stand on said head-rollers during elevation of said device.

7. In combination, a drill pipe line comprising sections of drill pipe coupled together, make and break tonging mechanism for the pipe line for making and breaking the pipe couplings, means for rotatably supporting a stand of drill pipe prior to coupling of the same to or after uncoupling the same from the pipe line, means for raising and lowering the pipe stand, and spinning mechanism movable up and down in unison with the pipe stand for spinning the latter on said rotatably supporting means to connect or disconnect the stand to or from the pipe line.

8. In combination, in a pipe transfer mechanism, an extendible column, means for freely rotatably supporting a pipe stand on said column in vertical parallelism therewith, means for extending said column in a vertical direction to elevate said rotatably supporting means to effect elevation of the pipe stand therewith, and means on said column for rotating said pipe stand as the latter is elevated in unison with said rotatably supporting means.

9. A combination as set forth in claim 8 wherein means is provided on said column to swing said pipe supporting and rotating means horizontally about the vertical axis of said column thereby to swing the elevated pipe stand horizontally therewith.

10. In a transfer mechanism for drill rigs, an upright transfer shaft having a vertically extendable portion, a roller supporting head carried by said extendable portion and having rollers for freely rotatably supporting a stand of drill pipe, the drill pipe having a downwardly facing roller engaging surface whereby the pipe stand is suspended from said supporting head, a turning device carried by said extendable shaft portion for turning the pipestand on said roller supporting head as it moves vertically with said extendable shaft portion, and means for extending said shaft portion to move the pipe stand vertically concurrently with rotation thereof by said turning device.

11. A roller supporting head for drill pipe comprising a horizontal frame, a pipe-engaging roller journaled on said frame to turn about a vertical axis, cooperating lever arms pivotally mounted on said frame and carrying pipe engaging rollers respectively, said rollers having smooth non-gripping cylindrical peripheries, and means for swinging said lever arms to bring said rollers into peripheral guiding contact with the drill pipe, the drill pipe having an annular downwardly facing shoulder with which said second mentioned rollers have supporting engagement whereby the drill pipe is freely rotatively suspended from the supporting head.

12. A roller supporting head as set forth in claim 11 wherein said second mentioned rollers have their smooth peripheries each lying in the surface of a cone and are mounted on said arms respectively to turn about relatively inclined axes for engaging the annular shoulder which is formed on the box end of the drill pipe.

13. In combination, a hoisting mechanism for a drill pipe line comprising a series of pipe sections coupled together, said hoisting mechanism having means attachable to a pipe section for supporting the pipe line and adapted to raise and lower the pipe line, a make and break device for connecting and breaking the joints of the pipe line for attaching a pipe stand to or detaching the same from the pipe line, a spinning device for completely connecting or releasing the joints of a stand of drill pipe when the pipe stand is released from the pipe line by said make and break device, said hoisting mechanism operable to raise and lower the pipe stand with respect to said make and break device and said spinning device while said devices are released from the pipe stand, and elevating means for said spinning device for moving the same with the detached stand or drill pipe and the pipe stand is raised or lowered and spinning of the pipe stand is effected, said elevating means being separate from said hoisting mechanism but cooperating with the latter in the handling of the pipe line and the pipe stand.

14. In combination, a drill pipe line adapted to move axially into and out of a hole, a supporting head having rollers for freely rotatably supporting a stand of drill pipe detached from the pipe line, said pipe stand extending axially through said head and having a downwardly facing roller engaging shoulder spaced axially from its ends whereby the pipe stand is suspended at an intermediate point along its length from said head, and elevating means for said head for moving the pipe stand supporting thereby upwardly with respect to the pipe line and for lowering the pipe stand toward the pipe line.

15. In combination, a drill pipe line movable into and out of a hole, means for freely rotatably supporting a stand of drill pipe detached from the pipe line, the pipe stand extending upwardly through said supporting means and having a downwardly facing shoulder intermediate its ends whereby the pipe stand is suspended at an intermediate point along its length from said supporting means, elevating means for raising and lowering the detached drill pipe stand with respect to the pipe line, and pipe rotating means movable with said elevating means and the pipe stand for rapidly rotating the latter during elevation thereby said elevating means.

16. A combination as set forth in claim 14 wherein means is carried by said elevating means and engaging the pipe stand at a point spaced axially thereof with respect to said roller-head for rotating the pipe stand as the latter is raised or lowered.

References Cited in the file of this patent
UNITED STATES PATENTS

| | | |
|---|---|---|
| 1,781,707 | Sheldon | Nov. 18, 1930 |
| 1,883,010 | Sherwood | Oct. 18, 1932 |
| 2,416,815 | Calhoun | Mar. 4, 1947 |
| 2,450,934 | Calhoun | Oct. 12, 1948 |
| 2,547,398 | Lee | Apr. 3, 1951 |
| 2,567,039 | Stone | Sept. 4, 1951 |
| 2,633,333 | Storm | Mar. 21, 1953 |